United States Patent [19]

Onozuka et al.

[11] 4,124,563

[45] Nov. 7, 1978

[54] STRETCHED MOLDING COMPOSED OF CALCIUM SULFITE-CONTAINING POLYETHYLENE COMPOSITION AND A PROCESS FOR THE PREPARATION THEREOF

[75] Inventors: Mitsuo Onozuka; Koki Nomoto; Kiichi Endo, all of Iwaki, Japan

[73] Assignee: Kureha Kagaku Kogyo Kubushiki Kaisha, Tokyo, Japan

[21] Appl. No.: 768,375

[22] Filed: Feb. 14, 1977

Related U.S. Application Data

[63] Continuation of Ser. No. 274,296, Jul. 24, 1972, abandoned.

[51] Int. Cl.$^2$ .............................................. C08F 45/04
[52] U.S. Cl. .................................. 260/42.24; 264/175; 264/210 R; 264/288; 264/289; 428/910
[58] Field of Search ................... 264/175, 210 R, 288, 264/289 R, 291; 260/42.24; 428/137, 910, 113; 162/157 R, 181 A; 423/161, 512

[56] References Cited

U.S. PATENT DOCUMENTS

| 2,235,531 | 3/1941 | Plumstead | 162/181 A |
| 3,154,461 | 10/1964 | Johnson | 264/289 |
| 3,201,506 | 8/1965 | Bills | 264/210 R |
| 3,660,551 | 5/1972 | Susuki et al. | 264/49 |
| 3,725,336 | 4/1973 | Susuki et al. | 260/42.24 |
| 3,739,060 | 6/1973 | Tomiyama et al. | 260/42.24 |
| 3,825,656 | 7/1974 | Murakami et al. | 423/512 |

*Primary Examiner*—Jeffery R. Thurlow
*Attorney, Agent, or Firm*—Holman & Stern

[57] ABSTRACT

A pervious sheet of a polyolefin composition containing 50-85 wt.% of an inorganic material such as calcium sulfite is disclosed. The calcium sulfite is preferably employed in the form of the crystalline semi-hydrate, with the crystals being in the rectangular form having a short axis of 1-30 $\mu$ and a long axis of 5-100 $\mu$. Also disclosed is a method for the manufacture of these compositions.

2 Claims, 1 Drawing Figure

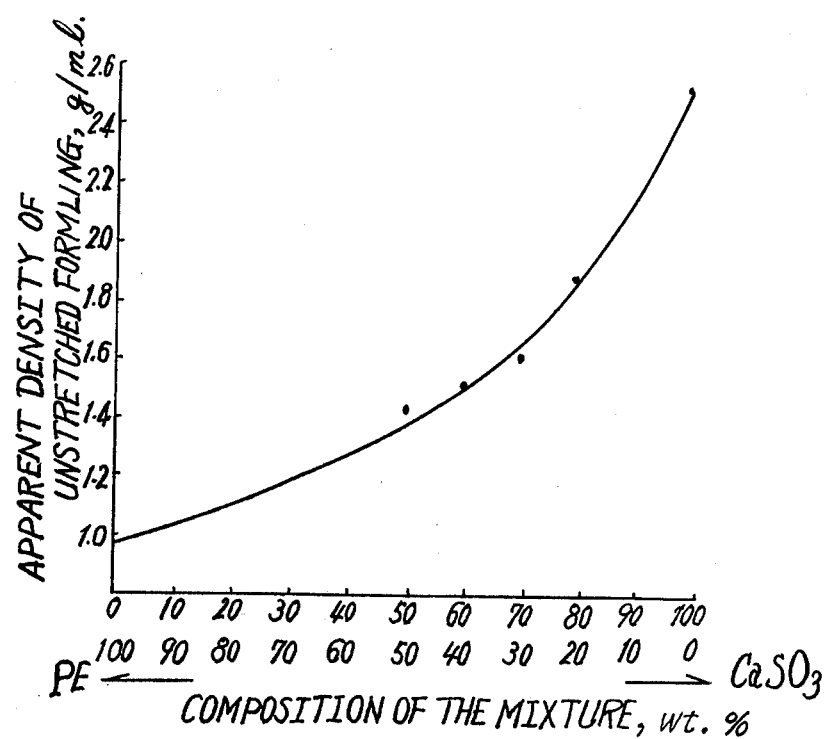

STRETCHED MOLDING COMPOSED OF CALCIUM SULFITE-CONTAINING POLYETHYLENE COMPOSITION AND A PROCESS FOR THE PREPARATION THEREOF

BACKGROUND AND SUMMARY OF THE INVENTION

This is a continuation of application Ser. No. 274,296, filed July 24, 1972 now abandoned.

This invention relates to a continuous, soft, pervious and light weight sheet of polyolefin composition comprising 50-85 wt. % of inorganic substance, preferably calcium sulfite semi-hydrate, and representing various improved physical properties, especially adapted for use as artificial leather, paper and the like. It concerns further a process for the manufacture of such composition products as referred to above.

Various processes have hitherto been proposed for the manufacture of pervious sheet of synthetic resin.

According to a prior proposal, the material resin is fabricated into granules which are then subjected to a sintering step. According to a second prior proposal, a mixture is prepared from a preferred synthetic resin and an inorganic or organic substance which is capable of later dissolving from the mass. Accordingly to a further prior proposal, a synthetic resin is mixed with a foaming agent. It has been found according to our profound experimental results that any prior product prepared by any one of the aforementioned proposals lacks at least one of the required main physical properties for the desired purpose, such as, for instance, pliability, mechanical strength and permeability.

When observing the animal fur, it contains natural fibers which are combined together into a sheet mass by tannic and resinous substances as binder which fur sheet is then subjected artificially to repeated bending and stretching stresses on the correspondingly processing machines, so as to partially loosen the bound portions of the fur for softening thereof.

In the case of the paper, it is also found that the fibers are bound together by means of sizing material, thus providing similar properties to those of the fur.

In order to artificially manufacture fur- or paper like products, those skilled in the art are making their efforts to cultivate improvements of non-woven textures as the main constituent.

In order to manufacture the non-woven fabrics, however, it is naturally necessary to prepare beforehand the artificial fibers, a process which is highly complicated and time consuming.

It is therefore the main object of the present invention to provide a simpler process for the manufacture of a continuous pervious and pliable material similar to natural leather, artificial paper or the like.

It is now found that such a product can be produced in such a highly simple and convenient way, that is a mixture is prepared from polyolefin and an inorganic substance comprising as its main constituent calcium sulfite in which the mixture is formed under its fused conditions into a sheet or the like product, the sheet being then subjected to a monoaxial or polyaxial stretching as the case may be.

The inorganic substance may preferably amount to about 50 to about 85 wt. % of the mixture in total. The calcium sulfite, semi-hydrate may preferably be in the form of fine crystals of particle sizes 1-100$\mu$.

The polyolefin composition has an apparent density of 0.3-1.0 gm/cm$^3$; Young's modulus of 100-4,000 kg/cm$^2$; tensile strength as measured at least in one direction: 50-700 kg/cm$^2$; and softening temperature as measured in accordance with JIS (Japanese Industrial Standard, S-6723): less than −50° C.

The molding appearing in advance of the stretching step is a composition of calcium sulfite and polyolefin having a stretch breaking strength of at least 50%, as measured in accordance with JIS, K-6771, and it is subjected then to stretching at least in one direction to a length of at least 150% of the original.

The aforementioned molding can preferably be prepared in such a way that 50-85 wt. % of crystalline calcium sulfite, semi-hydrate, each crystal being in the rectangular form having a short axis of 1-30$\mu$ and a long axis of 5-100$\mu$, and 15-50 wt. % of crystalline polyethylene or polypropylene, are mixed together and then the mixture is subjected to stretching to the aforementioned dimension. By this stretching, the intimate bonded combination between the sulfite and polyolefin crystals are caused forcibly to separate, thereby forming voids.

In place of the aforementioned stretching, the mixture can be subjected to bending or twisting stresses for the invitation of similar interfacial separation in an easy way.

The formed product according to the present invention has the property that, when it is subjected to considerable bending deformation of 90° or more and then returned to its initial unbent condition, and with such deformation of 90° or more being repeated but in the reverse direction, the product assumes an easily deformable, soft and pliable nature, this property being due to the interfacial separation between the filler (CaSO$_3$ . $\frac{1}{2}$ H$_2$O) and the polyolefin matrix.

As an example, the high density polyethylene has an apparent density value generally of 0.93-0.98 gm/cm$^3$, while the specific gravity calcium sulfite, semi hydrate, amounts generally to 2.45-2.55 gm/cm$^3$. The similar value of the molded article of the polyethylene composition including 50-85 wt. % of the semi-hydrate, and in the formed shape in the above mentioned sense will be 1.4-1.9 gm/cm$^3$.

According to the common sense prevailing among those skilled in the art, the crystalline high molecular composition in its shaped form, such as, of high density polyethylene will generally represent an intensified crystallization upon being subjected to stretching, thus representing thereby an increased apparent density. Therefore, any person skilled in the art does not know such a polyolefin composition molding as representing an apparent density value, as low as $\frac{1}{2}$-$\frac{1}{4}$ of the original owned corresponding value, only upon being subjected to a certain stretching step.

The variation in the apparent density of a polyethylene/calcium sulfite mixture molding as varied with the degree of stretching is shown in the following Table 1.

Table 1

Variation in apparent density of moldings prepared from mixture of polyethylene (PE)/ calcium sulfite (CaSO$_3$·$\frac{1}{2}$H$_2$O) with increase of stretch factor

| PE/ CaSO$_3$·$\frac{1}{2}$H$_2$O, wt. % | Before stretching | Stretch factor two times apparent density, g/cm$^3$ | four times | six times |
|---|---|---|---|---|
| 50/50 | 1.43 | — | 0.74 | 0.64 |
| 40/60 | 1.50 | — | 0.66 | 0.65 |

Table 1-continued

Variation in apparent density of moldings prepared from mixture of polyethylene (PE)/ calcium sulfite (CaSO$_3$.½H$_2$O) with increase of stretch factor

| PE/ CaSO$_3$.½H$_2$O, wt. % | Stretch factor | | | six times |
|---|---|---|---|---|
| | Before stretching | two times | four times | |
| | apparent density, g/cm$^3$ | | | |
| 30/70 | 1.61 | — | 0.55 | 0.57 |
| 20/80 | 1.86 | 0.63 | (0.6)* | — |

*stretch of three times

Remarks

Calcium sulfite was used in the form of fine rectangular prismoidal crystals, having a shorter axial length of 5-10μ and a longer axial length of 30-40μ. Polyethylene was that which had been prepared by a low pressure synthetic process; melt index: 0.3.

As may become aware from the above Table 1, the density value decreases substantially upon execution of the stretching job, but it does not vary so much with variation of the composition ratio and the degree of stretching in terms of times.

The calcium sulfite semi-hydrate crystals of the mixture according to this invention are not subjected to deformation or crushing even during the forming step. In the stretching step as employed in the process according to this invention, the degree of orientation of the polyethylene crystals and the degree of fibrillation will be progressed so far. In this stage, the sulfite crystals perform slips relative to the polyethylene crystals, thereby inviting the formation of voids in an evenly distributed manner and representing a substantial decrease of its density, as a conclusion of our practical experiments.

The stretching conditions may be regular and the stretching process may be conventional.

Preferably, however, the stretching conditions may be such that certain stresses are impressed in and upon the treating material to such a degree that the necking phenomenon will appear during the stretching step. Under such preferably selected stretching conditions, the composition of polyethylene and calcium sulfite is subjected to orientation and the fibrillation of polyethylene can be substantially accentuated, especially so as to improve the strength of the final products. The stretching may be executed at a properly selected temperature condition from room temperature to about 130° C. at the highest.

At a temperature lower than the room temperature, a sufficient degree of stretching can not be brought about, while at a temperature higher than about 130° C., polyethylene may be softened and under stressed condition can not be realized.

As for the molding which is used in the process according to this invention and comprises polyolefin and specifically selected inorganic substance, preferably fine crystalline calcium sulfite, the inorganic substance must have a specific characteristic so as to allow a sufficient and simpler separation between the both substances at the interfacial zones when subjected to mechanical stresses; thus any commercially procurable plain calcium sulfite can not be utilized for the desired purpose.

The most recommendable calcium sulfite may preferably be such one which takes the form of fine cubes or fine rectangular plate-like or prismoidal shapes, each having a shorter axial length of 1-30μ and a longer axial length of 5-100μ. This sulfite is calcium sulfite semi-hydrate and composed of relatively large size cubic or rectangular plate-like single crystals and can not be obtained by the conventional well-known industrial manufacturing processes, such as through reaction of gaseous sulfur dioxide with slaked lime, through reaction of alkali bisulfite with slaked lime or calcium chloride, or the like. The sulfite as obtained through these known industrial processes represents a fine crystal powder of less than 1μ or in the form of rather larger polycrystals, thus substantially developed single crystals being practically not obtainable through these known processes.

The most recommendable process for the preparation of sulfite in the above sense and usable in the process according to this invention may be realized by such that alkali or bisulfite-ammonium is reacted with calcium carbonate. Although it is highly preferable that the single sulfite crystal must have a pure and smooth as possible surface condition in order to obtain better interfacial separation between sulfite crystals and polyolefin as desired in the foregoing, a mixture with other inorganic substance or substances may well be utilized for mixing with the polyolefin.

These additive inorganic substances may have other shapes and dimensions than above specified. For this purpose, regular calcium sulfite, gypsum, calcium carbonate, iron oxide, zinc oxide, kieselguhr, quarz sand, regular sand, talc and/or the like may be used preferably at about 30 wt. % at the highest relative to the total amount of the mixture with said specifically selected crystalline calcium sulfite semi-hydrate as the main constituent thereof, having sizes of 1-100μ as was referred to hereinbefore.

As the polyolefin, a polymer or copolymer having, as its main constituent, ethylene and/or polypropylene, having a better crystalinity and a melt index less than 10, may be preferred.

As the copolymeric constituents, olefin such as ethylene, propylene, butene, pentene and the like; halogenated olefins such as vinyl fluoride, chlorofluoroethylene, tetrafluoroethylene and the like, and/or unsatulated compounds copolymerizable with ethylene, such as vinyl acetate; alkyl methacrylate and the like.

The sheet products prepared by the process according to this invention represent sufficient pliability and permeability even at a substantially low temperature as at −50° C. or less, as those of leather and paper. The sheet products may be printed and/or dyed with oily or aqueous ink or color stuff. In addition, they can be stuck together by means of aqueous, oily or hardenable adhesives, thus finding their various usages in place of conventional leather and paper.

It should be further stressed that the calcium sulfite semi-hydrate usable in the process according to this invention can be obtained in large amounts and in the form of byproducts through the process for desulfurization of combustion gases as a measure of public hazard prevention in this respect. Therefore, the invention can accelerate considerably the desulfurizing process of the combustion gases as an effective measure of the public hazard prevention, since, hitherto, the byproducts, calcium sulfite, could not find any economical usage specially when the amount is substantially large. Since calcium sulfite turns by oxidation at high temperature to gypsum which is not harmful to human bodies and the products of the invention are highly difficult to burn, the invention represents a remarkable progress in the art.

BRIEF DESCRIPTION OF THE DRAWINGS

The accompanying drawing represents the relationship between the composition ratio of a polyethylene-calcium sulfite composition in the form of an unstretched sheet, and the apparent density.

As the polyethylene, "Hyzex", density: 0.95 g/ml, was used. The calcium sulfite semi-hydrate was in the form of prismatic crystals, particle size: 5–40μ; specific gravity: 2.52 g/ml.

DESCRIPTION OF THE PREFERRED EMBODIMENTS

The following examples will provide a clearer understanding of the present invention, although the invention is not in any way intended to be thereby limited.

EXAMPLE 1

Several compositions as enlisted in the following Table 2, comprising calcium sulfite semi-hydrate (true specific gravity: 2.52) in the form of prismatic crystals, shorter axial length being 5–10μ and longer axial length being 20–40μ, and commercially procured polyethylene, melt index: 0.3, were thoroughly kneaded separately by passing them through a calendering machine with rolls kept at a surface temperature of 150°–160° C., and for 3 minutes, to provide sheets, about 0.5 mm thick.

These sheets were cut separately into prescribed sizes of 10 × 10 cm.

Three sheets thus cut and belonging to each group were processed in a stack on a press machine, having chromium-coated die plates, at a temperature of 180°–190° C. under a load of 100 kg/cm² for 5 minutes into a pressed sheet 1 mm thick. This pressed sheet was cut into sizes of 5 × 10 cm, and then subjected to a monoaxial stretching in a heated air atmosphere, 100°–120° C. The stretching factor for each test is enlisted in the same Table 2.

Regardless of the stretching factor, the apparent density showed less than 1.0 g/cm³ and all the sheet products were pervious.

As a reference, when used commercially available calcium sulfite semi-hydrate, or that obtained by blowing of sulfur dioxide gas into milk of lime and representing finer crystals of grain sizes less 5μ, in combination with polyethylene, the pressed boards could not be stretched in heated air bath kept less than 130° C.

The composition comprising prismatic crystals of calcium sulfite semi-hydrate as recommended by the present invention may be subjected to even and easy interfacial separation between the polymer constituents and the sulfite constituents which separation is observed over the whole area of the pressed sheet in an evenly distributed way, thus being capable of subjecting to stretching under heated condition.

On the contrary, in the case of reference samples 5-1; 5-2; 5-3 and 5-4 listed in the following Table 2, it was experienced with highly uneven stretch and the external stresses were locally centralized at the stretching area. For this reason, these reference samples were broken before attaining 1.5-time elongation by stretch. Thus, the desired pervious sheets could not be realized.

Table 2

Compositions of polyethylene/calcium sulfite semi-hydrate mixture, and the relative relationship between tenacity-and-elongation and apparent density of test samples subjected to stretch of various degrees

| Sample No. | PE/CaSO₃ . ½ H₂O wt. %[1] | Stretching factor (times) | Strength[3] kg/cm² | Elongation, %[3] | Young's modulus kg/cm²[3] | Apparent density g/cm³ | $T_f$ temp., °C** |
|---|---|---|---|---|---|---|---|
| 1-1 | 50/50 | unstretched | 121 | 73 | 2800 | 1.43 | 20.4 |
| 1-2 | | 4 | 493 | 32 | 1920 | 0.74 | less than −80 |
| 1-3 | | 6 | 450 | 18 | 2760 | 0.64 | " |
| 2-1 | 40/60 | unstretched | 113 | 174 | 2000 | 1.50 | 13.0 |
| 2-2 | | 4 | 380 | 30 | 1620 | 0.66 | less than −80 |
| 2-3 | | 6 | 310 | 26 | 1950 | 0.65 | " |
| 3-1 | 30/70 | unstretched | 92 | 255 | 1800 | 1.61 | −4.0 |
| 3-2 | | 4 | 270 | 18 | 1390 | 0.55 | less than − |
| 3-3 | | 6 | 240 | 10 | 1970 | 0.57 | " |
| 4-1 | 20/80 | unstretched | 61 | 121 | 1100 | 1.86 | −39.0 |
| 4-2 | | 2 | 73 | 116 | 500 | 0.76 | less than −80 |
| 4-3 | | 3 | 85 | 63 | 1000 | 0.60 | " |
| Stetching Control No. | PE/CaSO₃ . ½H₂O[2] wt.% | factor, (times) | | | | | |
| 5-1 | 50/50 | 1.5 | broken (unable to stretch) | | | | |
| 5-2 | 40/60 | " | " | | | | |
| 5-3 | 30/70 | " | " | | | | |
| 5-4 | 20/80 | " | " | | | | |

[1] polyethylene ("Hyzex", density : 0.95 g/cm³, melt index : 0.3)
[2] sulfur dioxide gas is blown into milk of lime to produce fine crystals of semi- sulfite semihydrate, of particle sizes less than 5 μ.
[3] measurement of strength and elongation was made in accordance with provisions, JIS-K6723(1969) under winding speed of 200 mm/min., at room temperature on a tension tester "Tenshiron", manufactured and sold by a Japanese firm Toyo Seiki Kabushiki Kaisha, Tokyo.

EXAMPLE 2

A composition of calcium sulfite semi-hydrate, in the form of global crystals (true specific gravity: 2.49) and commercially procured polypropylene, of melt index: 0.5, as enlisted at 6-1 in the following Table 3, was processed into a sheet at the roll surface temperature 180°–190° C. on a calendering machine. This sheet was then air-cooled and stretched biaxially on a tenter machine in air bath heated at 130°–150° C., inviting an evenly distributed interfacial separations between the filler and the matrix. The thus prepared stretched sheet represented an apparent density value of 0.5 g/cm³. The strength elongation and softening temperature of this calendered and stretched sheet are shown in the following Table 3.

Table 3

Strength, elongation and lowest limit of softness and pliability maintaining temperature of a calendered and biaxially stretched sheet of a composition polypropylene/calcium sulfite hydrate

| Sample No. | PP/CaSO$_3$·½H$_2$O, wt. % | biaxial Stretch factor longit. | lat. | Strength, kg/cm$^2$* | elongation, % | T$_f$ °C | Young's modulus kg/cm$^2$ |
|---|---|---|---|---|---|---|---|
| 6 − 1 | 30/70 | 4-times | 4-times | 220 | 12 | less than −80 | 3000 |

*values measured in the longitudinal direction of the sample (the strength of the unstretched sheet : 138 kg/cm$^2$; the elongation thereof: 123%)
***lower limit of pliability maintaining temperature
"softening temperature" may preferably be expressed by "lower limit of pliability-maintaining temperature t$_f$

EXAMPLE 3

Sample 3-1 (PE/CaSO$_3$·½H$_2$O = 30/70 wt. %) described in the foregoing Example 1 (shown at 7-2) was subjected successively to bending treatment, with 90 deg. bend, beginning from one end through middle part to the opposite end of the sample, thereby causing the mechanical separations between polyethylene components and sulfite components. Similar sample 7-1 was prepared from polyethylene only, thus including no fillers. The latter was only impressed with stresses from outside.

The thus stressed samples were measured of their respective lower limits of the softness and pliability-maintaining temperature. The results are shown in the following Table 4.

Table 4

| Sample No. | Sample | lower limit of pliability-maintaining temperature | |
|---|---|---|---|
| | | before execution of bending processings | after bending processings |
| 7 − 1 | Sheet formed solely of polyethylene | −1° C | −3° C |
| 7 − 2 | sample 3 − 1 | −4° C | −64° C |

EXAMPLE 4

Manufacture of Calcium Sulfite employable in the Invention 5,200 g of an aqueous solution as obtained by treating combustion exhaust gases coming from a power generating plant fitted with steam boilers fueled with heavy oil, with aqueous solution of sodium sulfite, and containing 8 wt. % of sodium bisulfite, 14.7 wt. % of sodium sulfite and 3 wt. % of sodium sulfate, were introduced into a reactor fitted with agitator, and brought into reaction by addition of 200 g of calcium carbonate, having passed through a 200-mesh screen, at 80° C. for 90 minutes.

The reaction product, calcium sulfite semi-hydrate, was instantly conveyed to a filter unit for avoiding possible oxidation, for filtration and the filtered material was washed with clean water.

Upon being microscopically observed, the thus obtained calcium sulfite semi-hydrate was in the form of prismatic crystals having substantially uniformed dimensions, shorter axial length: 5–10μ; longer axial length: 30–40μ.

When immersed in methyl red-benzene solution, these crystals became red, and they showed a solid acidity of acid strength +3.3–+4.8, without being colored by contact with p-dimethylamino-azobenzene.

EXAMPLE 5

The calcium sulfite semi-hydrate obtained in the foregoing Example 4 (true specific gravity 2.52 as measured with toluene) was mixed throughly with commercially procured low pressure polyethylene (melt index: 0.3). This composition was kneaded on a roll kneader (surface temperature of the calendering rolls: 150°–160° C.) for about 10 minutes and fabricated into rolled sheets, about 0.5 mm thick.

These sheets were cut into prescribed sizes of 10 × 10 cm. Three sheets thus cut were processed in a stack on a press machine, having chromium-coated die plates, at a temperature of 180° C. under a load of 100 kg/cm$^2$ for 5 minutes into a pressed sheet was cut into sizes of 2 × 10 cm, and then subjected to a monoaxial stretching in a heated air atmosphere, 100°–120° C. The test was repeated under various conditions as enlisted in Table 5. The stretching factor for each test is also enlisted in the same Table 5.

Regardless of the stretching factor, the apparent density showed less than 1.0 g/cm$^3$ and all the sheet products were pervious. The strength was also superior. The products were capable of floating on water.

Table 5

Compositions of polyethylene/calcium sulfite composition, and the relative relationship between tenacity-and-elongation and apparent density of test samples subjected to stretch of various degrees

| Sample PE/CaSO$_3$, wt.% ½ H$_2$O | Stretching factor (times) | Strength kg/cm$^2$ | Elongation, % | Apparent Density g/ml |
|---|---|---|---|---|
| 50/50 | unstretched | — | — | 1.43 |
| | 4 | 480–550 | 24–35 | 0.74 |
| | 6 | 600–650 | 8–30 | 0.64 |
| 40/60 | unstretched | 150–200 | 150–250 | 1.50 |
| | 4 | 350–400 | 15–40 | 0.66 |
| | 6 | 300–350 | 20–30 | 0.65 |
| 30/70 | unstretched | 80–120 | 50–170 | 1.61 |
| | 4 | 250–300 | 13–21 | 0.55 |
| | 6 | 200–270 | 8–13 | 0.59 |
| 20/80 | unstretched | 60–100 | 20–70 | 1.86 |
| | 3 | 100–130 | 10–20 | 0.6 |

The term "softening temperature" appearing at several places throughout the foregoing specification may better be expressed by "lower limit of softness and pliability-maintaining temperature".

The embodiments of the invention in which an exclusive property or privilege is claimed are as follows:

1. A pervious sheet comprising 50–85 wt. % of crystaline calcium sulfite semi-hydrate, being in the rectangular form and having a short axis of 1–30 μ and a long axis of 5–100 μ and having been prepared by the reaction of sodium or ammonium-bisulfite with calcium carbonate; and 15–50 wt. % of polyolefin, said sheet being stretched at least in one direction to at least 1.5 times the length of its original dimension and having an apparent density: 0.3–1.0; Young's modulus: 100–4,000 kg/cm$^2$; a tensile strength: 50–700 kg/cm$^2$; and lower limit of pliability-maintaining temperature: less than −50° C.

2. A process for the manufacture of a pervious sheet, comprising the following steps of: preparing a mixture of 50–85 wt % of calcium sulfite semi-hydrate crystals which are in the rectangular form and have a short axis of 1–30 μ and a long axis of 5–100 μ and having been prepared by the reaction of sodium or ammonium-bisulfite with calcium carbonate; and 15–50 wt % of polyolefin; calendering such mixture into a sheet; and stretching said sheet at least in one direction to at least 1.5 times the length of the original sheet.

* * * * *